(12) United States Patent
Lewbel et al.

(10) Patent No.: US 9,244,604 B1
(45) Date of Patent: Jan. 26, 2016

(54) ADAPTIVE TOUCH SENSOR INTERFACE

(75) Inventors: Hannah Rebecca Lewbel, Campbell, CA (US); Vijay Manyam, Sunnyvale, CA (US); Eric Allan MacIntosh, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 617 days.

(21) Appl. No.: 12/940,831

(22) Filed: Nov. 5, 2010

(51) Int. Cl.
*G06F 3/041* (2006.01)
*G06F 3/0488* (2013.01)

(52) U.S. Cl.
CPC .......... *G06F 3/0488* (2013.01); *G06F 3/04883* (2013.01)

(58) Field of Classification Search
CPC ..... G06F 3/0488; G06F 9/4443; G06F 3/044; G06F 3/045; G06F 3/04883
USPC .......................................... 345/173; 715/866
See application file for complete search history.

(56) References Cited

U.S. PATENT DOCUMENTS

| | | | | |
|---|---|---|---|---|
| 5,581,484 | A * | 12/1996 | Prince | 702/150 |
| 7,103,852 | B2 * | 9/2006 | Kairis, Jr. | 715/800 |
| 7,401,300 | B2 * | 7/2008 | Nurmi | 715/866 |
| 7,839,381 | B2 * | 11/2010 | Zhou et al. | 345/107 |
| 2004/0263484 | A1 | 12/2004 | Mantysalo et al. | |
| 2005/0206730 | A1 * | 9/2005 | Hagiwara | 348/169 |
| 2005/0225538 | A1 * | 10/2005 | Verhaegh | 345/173 |
| 2006/0197750 | A1 | 9/2006 | Kerr et al. | |
| 2006/0267953 | A1 * | 11/2006 | Peterson et al. | 345/173 |
| 2008/0001929 | A1 * | 1/2008 | Wulff | 345/175 |
| 2008/0100586 | A1 * | 5/2008 | Smart | 345/173 |
| 2008/0254837 | A1 * | 10/2008 | Klinghult et al. | 455/566 |
| 2009/0201246 | A1 * | 8/2009 | Lee et al. | 345/156 |
| 2009/0201260 | A1 | 8/2009 | Lee et al. | |
| 2009/0209293 | A1 * | 8/2009 | Louch | 455/566 |
| 2009/0213081 | A1 | 8/2009 | Case, Jr. | |
| 2010/0013777 | A1 | 1/2010 | Baudisch et al. | |
| 2010/0127995 | A1 | 5/2010 | Rigazio et al. | |
| 2010/0225599 | A1 | 9/2010 | Danielsson et al. | |
| 2010/0299596 | A1 | 11/2010 | Zalewski et al. | |
| 2011/0021251 | A1 | 1/2011 | Linden | |
| 2011/0057889 | A1 | 3/2011 | Sakatsume | |

(Continued)

FOREIGN PATENT DOCUMENTS

JP 2008191791 A * 8/2008

OTHER PUBLICATIONS

Machine translation of JP 2008-191791.*

(Continued)

*Primary Examiner* — Aneeeta Yodichkas
*Assistant Examiner* — Joseph Fox
(74) *Attorney, Agent, or Firm* — Lee & Hayes, PLLC

(57) ABSTRACT

A touch sensor on a device is configured to accept user input in the form of touches. Control areas on the touch sensor may be designated to correspond to keys on a keyboard or other commands. These control areas may be arranged on either side of the touch sensor to allow the user to activate control areas with their thumbs while holding the device. Size and spacing of the keys may vary dynamically in response to environmental conditions, user interactions, and so forth. Thus, the area of a control on the touch sensor may be larger when operated in a high vibration or motion environment, such as on a train, walking, and so forth. Additionally or alternatively, the position of control areas may dynamically change to adjust to the user.

23 Claims, 8 Drawing Sheets

(56) References Cited

U.S. PATENT DOCUMENTS

2011/0261058 A1 10/2011 Luo
2014/0253440 A1 9/2014 Karakotsios et al.

OTHER PUBLICATIONS

Tiainen, "The GKOS Keyboard Principle", Global Keyboard Open Standard, Retrieved on Apr. 29, 2010 at <<http://koti.mbnet.fi/gkos/gkoscom/gkos_principle.html>>, 2 pgs.

Office action for U.S. Appl. No. 12/827,392, mailed on Feb. 15, 2013, Karakotsios et al., "Dorsal Touch Input", 25 pages.

Juli Clover, "CES 2013: Canopy Sensus Case Adds Touch Controls to the iPhone's Back", retrieved at <<http://www.macrumors.com/2013/01/07/ces-2013-canopy-sensus-case-adds-touch-controls-to-the-iphones-back/>>, Jan. 7, 2013, 7 pages.

Office action for U.S. Appl. No.12/827,392, mailed on Aug. 8, 2013, Karakotsios et al., "Dorsal Touch Input", 6 pages.

Office Action for U.S. Appl. No. 14/196,787, mailed on Oct. 23, 2014, Kenneth M. Karakotsios, "Dorsal Touch Input", 14 pages.

* cited by examiner

ADAPTIVE TOUCH SENSOR INTERFACE

BACKGROUND

Electronic devices that accept input from users are ubiquitous, and include cellular phones, eBook readers, tablet computers, portable media devices, and so forth. Increasingly, users desire these devices to be easily portable yet remain capable of rapid and accurate data entry. However, ambient motion such as vibration, accelerations, and so forth may adversely affect the user's ability to correctly enter data or commands into the device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
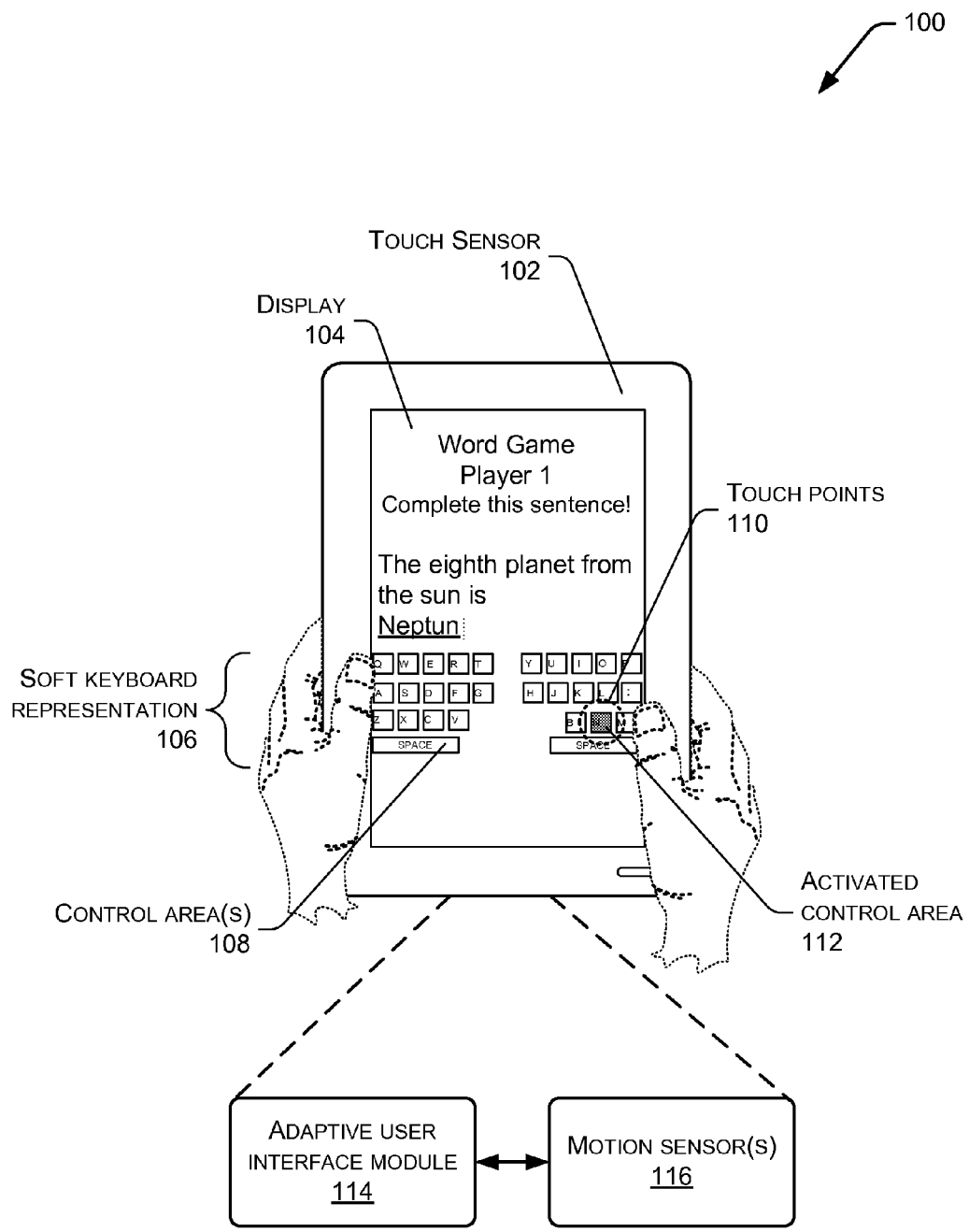
FIG. 1 depicts an electronic device configured to accept input from a touch sensor under the control of an adaptive user interface module.
Figure 1:
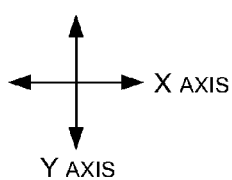

Electronic devices such as cellular phones, portable media players, tablet computers, netbooks, laptops, electronic book ("eBook") readers, and so forth, incorporate various input devices such as mechanical switches, touch sensors, and so forth to enable users to control and otherwise interact with the devices. Different control areas may be designated on the touch sensor, with different commands associated with those control areas in "soft" keys. In some devices, the touch sensor and a display combine to form a touch-sensitive display for input, providing dual functionality when combined. The display may present an image of a button coincident with the control area associated with a command.

This disclosure describes, in part, an architecture and techniques for utilizing a touch sensor and an adaptive user interface module to modify a user interface of an electronic device in response to various conditions. The adaptive user interface module may distribute control areas of the user interface along edges of the touch sensor. For example, a soft (or virtual) keyboard may be split such that half of the keys are distributed proximate to a left edge, while the remaining half of the keys are distributed proximate to a right edge. Once distributed, the user may activate the control areas using their thumbs while holding the device with the remaining fingers.

The adaptive user interface module may also adjust the size, position, and nature of what controls and data are available based at least in part on various conditions. These conditions may include light, sound, ambient motion of the device, and so forth. A motion sensor may couple to the adaptive user interface module to determine ambient motion. Ambient motion may include any sort of motion that the device experiences, such as motions to the device which are not under the intentional control of the user. These ambient motions may be accelerations, vibrations, rotations, translations, and so forth, which may occur for a pre-determined minimum duration. For example, the accelerations produced by an aircraft experiencing turbulence over several minutes are considered ambient motions. In contrast, the motion of a user rotating the device from portrait to landscape mode might not be considered ambient motion in some instances.

During periods of increased ambient motion, a user may find it more difficult to manipulate controls, read a display, and so forth. In one scenario, imagine a user trying to use an eBook reader device on the aircraft during turbulence. The shaking and jostling produced by a bumpy ride may impair a user's ability to read content displayed on the device as well as the user's ability to correctly manipulate desired controls, possibly resulting in inadvertent control actuations.

The adaptive user interface module is configured to monitor ambient motion and modify the user interface accordingly. Thus, during extreme turbulence the user interface on the eBook reader may display very large control areas to improve the ability of the user to activate a desired control while minimizing unintended activation of unwanted controls. Additionally, tolerances for gestural inputs may be increased to allow for more variation due to the ambient motion. The presentation of the user interface may also adjust to increase text size, alter fonts, and so forth to improve readability under such conditions.

The adaptive user interface module may also be configured to reposition control areas to match a particular user's reach or input style. For example, a user with smaller hands may find it a stretch to reach the center of the control area for the letter "N" on the soft keyboard with their thumb. As a result, they may have a touch which is centered on a lower right corner of the letter "N" rather than in the center of the control area designed for the "N." After monitoring this, the adaptive user interface module may be configured to reposition the control area for the letter "N," as well as a corresponding presentation of "N" key to correspond to the position of the user's input when trying to activate that command. Thus, the control areas may be dynamically positioned and repositioned, and may appear to the user to "drift" across the touch sensor to tailor to a particular user operating the device.

While these techniques are described in terms of an eBook reader device, the concepts described herein may also be applicable to cellular telephones, portable media players, desktop computers, laptops, tablet computers, netbooks, personal digital assistants, or other electronic devices.

Illustrative Touch-Screen Device

FIG. 1 depicts an electronic device 100 configured with a soft (or virtual) keyboard engaged. A touch sensor 102 comprises at least a portion of the surface of the device 100. The touch sensor 102 accepts input resulting from application of incident force, such as a user finger or stylus pressing upon the touch sensor.

The touch sensor 102 may comprise capacitive arrays, magnetic sensors, force sensitive resistors, interpolating force sensitive resistors (IFSR), camera, optical transmitter, optical receiver, and so forth. In some implementations, the touch sensor 102 comprises an IFSR array configured to determine position of a touch as well as the magnitude of the touch.

The touch sensor 102 may be configured such that user input through contact or gesturing relative to the display 104 may be received. However, in some implementations the touch sensor 102 may be used either without a display 104, or the touch sensor 102 may be non-coincident with the display 104. In some implementations, the device 100 may comprise more than one touch sensor 102.

The display 104 is configured to present information to the user. In some implementations, the display 104 and the touch sensor 102 may be coincident to provide a touch-sensitive display, or touchscreen display. As shown here, the display 104 provides a soft keyboard 106 laid out as a split keyboard in the QWERTY arrangement. The split keyboard comprises a left section and a right section. Within each section a plurality of keys from the keyboard are distributed. A control area 108 corresponding to each of the keys may be designated on the touch sensor 102.

In other implementations, other layouts may be used, including QWERTZ, AZERTY, QZERTY, Dvorak, and so forth. Furthermore, layouts may include other keyboards such as numeric keyboards, custom keyboards, chordic keyboards, and so forth. The soft keyboards supported by the device 100 described herein are not limited to those using two hands. For example, one-handed keyboards are also supported.

This soft keyboard 106 may be presented, or not, for user convenience. In the example depicted here, the user is completing data entry for the word "Neptune" and the letter "N" is being entered, as indicated by shading of the "N" key. That is, the user is providing a touch input on the touch sensor 102 to select the letter "N" with the display 104 presenting this selection on the soft keyboard 106.

Broken line circles denote touch points 110. These touch points 110 indicate points of contact between the user's fingers, stylus, and so forth, and the touch sensor 102 of the device 100. Also shown is an activated control area 112, such as when the user has touched the control area 108 for the letter "N." In this illustration, shading denotes the activated control area 112.

Also shown within the device is an adaptive user interface module 114 coupled to a motion sensor 116. The adaptive user interface module 114 is configured to modify the user interface at least partly in response to external conditions. These conditions may include motion-related conditions such as acceleration, rotation, heading, gravimetric readings, tilt, and so forth. The motion sensor(s) 116 provide the input for these motions. The motion sensors 116 may include accelerometers, gyroscopes, magnetometers, gravimeters, clinometers, tilt sensors, global position system devices, and so forth. In other implementations, other inputs may be used, such as ambient light, noise, and so forth. By using motion inputs gathered from the motion sensors 116, the adaptive user interface module 114 may rearrange, add, remove, or otherwise dynamically adjust the user interface to maintain usability during changes in environmental conditions.

Figure 2:
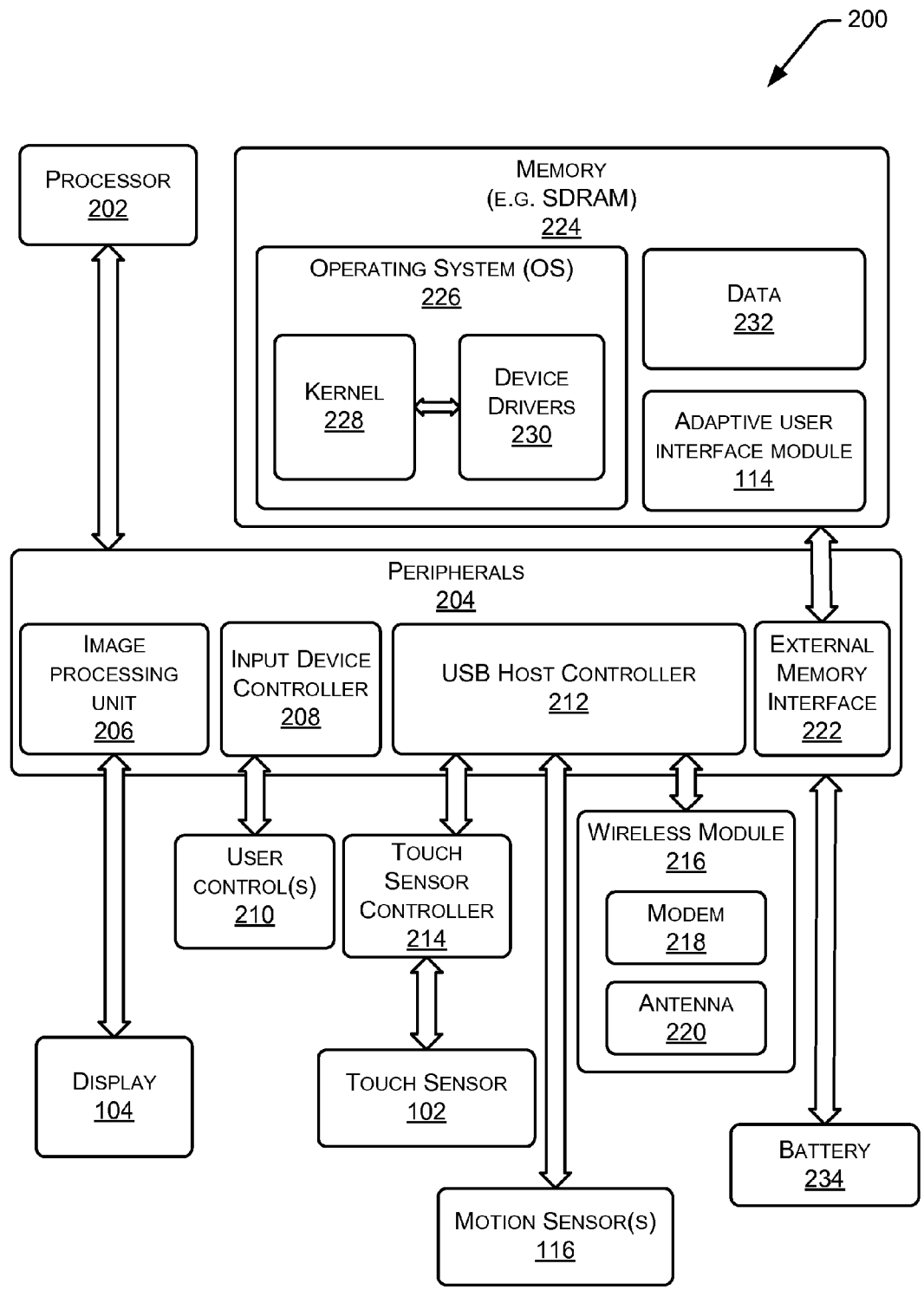
FIG. 2 is an illustrative schematic of the electronic device with the adaptive user interface module.

FIG. 2 is an illustrative schematic 200 of the electronic device 100 of FIG. 1. In a very basic configuration, the device 100 includes components such as a processor 202 and one or more peripherals 204. Each processor 202 may itself comprise one or more processors.

The peripherals 204 couple to the processor 202. An image processing unit 206 is shown coupled to one or more display components 104 (or "displays"). In some implementations, multiple displays may be present and coupled to the image processing unit 206. These multiple displays may be located in the same or different enclosures or panels. Furthermore, one or more image processing units 206 may couple to the multiple displays.

The display 104 may present content in a human-readable format to a user. The display 104 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

For convenience only, the display 104 is shown in a generally rectangular configuration. However, it is understood that the display 104 may be implemented in any shape, and may have any ratio of height to width. Also, for stylistic or design purposes, the display 104 may be curved or otherwise non-linearly shaped. Furthermore the display 104 may be flexible and configured to fold or roll.

The content presented on the display 104 may take the form of electronic books or "eBooks." For example, the display 104 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 may have an input device controller 208 configured to accept input from a keypad, keyboard, or other user controls 210. These user controls 210 may have dedicated or assigned operations. For instance, the controls may include page turning buttons, a navigational keys, a power on/off button, selection keys, joystick, touchpad, and so on.

The device 100 may also include a USB host controller 212. The USB host controller 212 manages communications between devices attached to a universal serial bus ("USB") and the processor 202 and other peripherals.

FIG. 2 further illustrates that the device 100 includes a touch sensor controller 214. The touch sensor controller 214 couples the touch sensor 102 to the processor 202 via the USB host controller 212 (as shown). In other implementations, the touch sensor controller 214 may couple the touch sensor 102 to the processor 202 via the input device controller 208, inter-integrated circuit ("I$^2$C"), universal asynchronous receiver/transmitter ("UART"), or serial peripheral interface bus ("SPI"), or other interfaces.

The touch sensor controller 214 is configured to determine characteristics of interaction with the touch sensor 102. These characteristics may include the location of the touch on the touch sensor 102, magnitude of the force, shape of the touch, and so forth.

The USB host controller 212 is also shown coupled to the motion sensor(s) 116. In other implementations, the motion sensor(s) 116 or individual sensors therein may couple to the processor 202 via the input device controller 208, I²C, UART, or SPI, or other interfaces.

The USB host controller 212 may also couple to a wireless module 216 via the universal serial bus. The wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, the device 100 may include a wired network interface.

The device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 224 may store an operating system 226 comprising a kernel 228 operatively coupled to one or more device drivers 230. The device drivers 230 are also operatively coupled to peripherals 204, such as the touch sensor controller 214. The external memory 224 may also store data 232, which may comprise content objects for consumption on eBook reader device 100, executable programs, databases, user settings, configuration files, device status, and so forth. Executable instructions comprising the adaptive user interface module 114 may also be stored in the memory 224. In some implementations, the touch sensor controller 214, the operating system 226, the kernel 228, one or more of the device drivers 230, and so forth, may perform some or all of the functions of the adaptive user interface module 114.

One or more batteries 234 provide operational electrical power to components of the device 100 for operation when the device is disconnected from an external power supply. The device 100 may also include one or more other, non-illustrated peripherals, such as a hard drive using magnetic, optical, or solid state storage to store information, a firewire bus, a Bluetooth™ wireless network interface, camera, global positioning system, PC Card component, and so forth.

Couplings, such as that between the touch sensor controller 214 and the USB host controller 212, are shown for emphasis. There are couplings between many of the components illustrated in FIG. 2, but graphical arrows are omitted for clarity of illustration.

Dynamic Touch Sensor Interface

Figure 3:
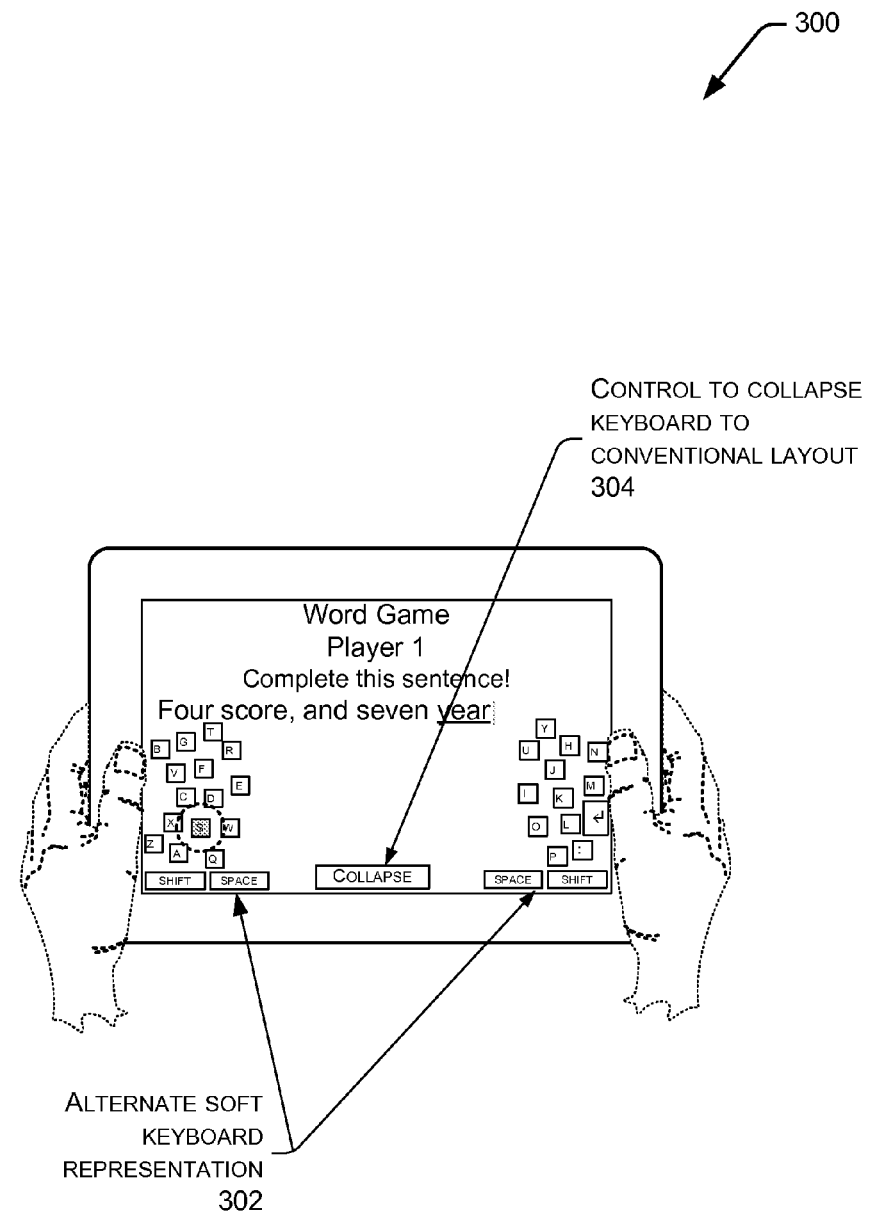
FIG. 3 depicts the electronic device operated in landscape mode showing an alternative soft keyboard arrangement mapped onto the touch sensor.

FIG. 3 depicts the electronic device 100 operated in landscape mode showing an alternative soft keyboard mapped onto the touch sensor 102. As shown in this view, the device 100 has been rotated such that the user's hands are positioned on either ends of the longest axis of the device 100. As illustrated, the adaptive user interface module 114 has positioned the control areas 108 into an alternate soft keyboard 302, either in response to the rotation detected by the motion sensors 116, in response to a user selection, or in response to a call by a program for the landscape mode.

In this alternate soft keyboard 302, the keys are distributed proximate to the edges by which the user may grip the device. As a result of this positioning, the user's thumbs may access the soft keys of the keyboard. In this implementation, the virtual keys are distributed in generally arcuate patterns.

In some implementations, a control to collapse the keyboard to a conventional layout 304 may also be presented. Upon activation, the adaptive user interface module 114 would move the control areas 108 of the soft keyboard such that they appear in a conventional linear arrangement, or some other non-illustrated arrangement.

By using the touch sensor 102 and freeing the user from dependence upon a physical keyboard, the user is thus able to easily transition the device 100 between portrait and landscape modes while retaining data input capabilities. Furthermore, as described below with regards to FIGS. 4-8, the size, position, and arrangement of control areas 108 may be adjusted based upon ambient conditions.

Figure 4:
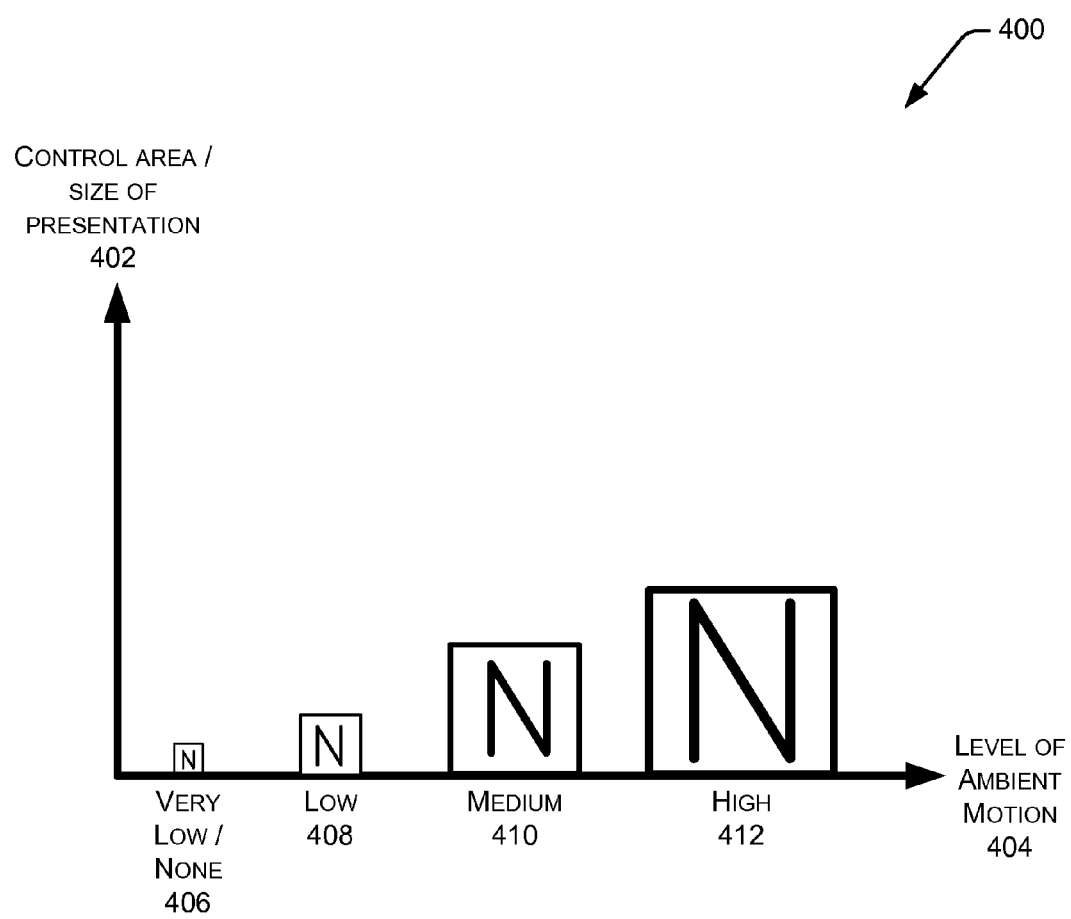
FIG. 4 is an illustrative graph showing how the adaptive user interface module may vary the dimensions of a control area in proportion to a level of ambient motion.

FIG. 4 is an illustrative graph 400 showing how the adaptive user interface module 114 may vary the dimensions of the control area 108 in proportion to the level of ambient motion. As described above, ambient motion includes motions such as linear translations, rotations, and so forth. These ambient motions may make it difficult for a user to interact with the device, such as by causing vibration which blurs text presented on the display 104 and jostles a user's finger while trying to enter touch input on the touch sensor 102.

The adaptive user interface module 114 within the device 100 may be configured to vary the dimensions of the control area(s) 108, of items presented on a display, and so forth at least partly in response to the ambient motion. In this graph, a vertical axis indicates a control area or size of presentation 402 while a horizontal axis indicates several levels of ambient motion 404.

For illustrative purposes, and not by way of limitation, assume that four levels of ambient motion are defined. An illustration of the control area 108 for the letter "N" is shown for each level. These four levels include very low or no ambient motion 406, low ambient motion 408, medium ambient motion 410, or high ambient motion 412. These thresholds may be absolute or relative. An absolute threshold is set such that a specific quantity or range of motion is required to meet that threshold. For example, where an absolute threshold is in use, the low motion 408 may comprise an acceleration of up to two (2) m/s, while a medium motion 410 may comprise an acceleration of between two and four (2-4) m/s. In some implementations the thresholds may incorporate different motions, or may vary by the motion. For example, a continuous series of short duration and low magnitude transient accelerations may be considered a high level of ambient motion when combined with a rotational rate of more than one pi radian/second.

In addition to the magnitude of the force, determination of an ambient motion may include how long the motions are present. For example, a break shock, such as a drop, may not be considered an ambient motion sufficient to trigger changes by the adaptive user interface module 114, while several shocks within a pre-determined period, such as three minutes or any other amount of time, may be considered ambient motion.

Thresholds for the levels of ambient motion may also be dynamic and adjust over time. The adaptive user interface module 114 may automatically raise and lower the ambient motion threshold for a given level of ambient motion, to account for the user's adjustment to operating in those environmental conditions. For example, a cabin attendant on the aircraft reading an eBook on the eBook reader device 100 may be more accustomed to the vibration, and may be able to compensate more easily for the vibration than an infrequent traveler. Thus, the thresholds within the adaptive user interface module 114 of the eBook reader device 100 used by the cabin attendant may be higher than those of the infrequent traveler. As a result, the cabin attendant may see smaller controls and more compact text, whereas the infrequent traveler sees larger controls and larger text.

Thresholds may also be dynamically adjusted based upon a number of received input errors. For example, use of the backspace key may be used as an indicator that the user has made an error in data entry. When the number of backspaces exceeds a pre-determined threshold, such as during a pre-determined time interval, the threshold may be decreased allowing for larger control areas.

In another implementation a separation between controls may vary proportionate to the level of ambient motion. For example, during a very low or no ambient motion 406 the separation between control areas such as the keys of the soft keyboard 106 may be 9 millimeters, while the separation may increase to 20 millimeters during high levels ambient motion 412.

Variation in the control area size and the separation of the control areas may be configured to occur contemporaneously or independently of one another and each may have different thresholds. For example, control area size may be configured to remain relatively small until a medium level of ambient motion 410 is experienced, while the separation between control areas may increase as the device transitions from the very low 406 to low 408 levels of ambient motion. Thus, in this example the user would experience an increase in the spacing between control areas, followed by an increase in the size of the control areas.

Figure 5:
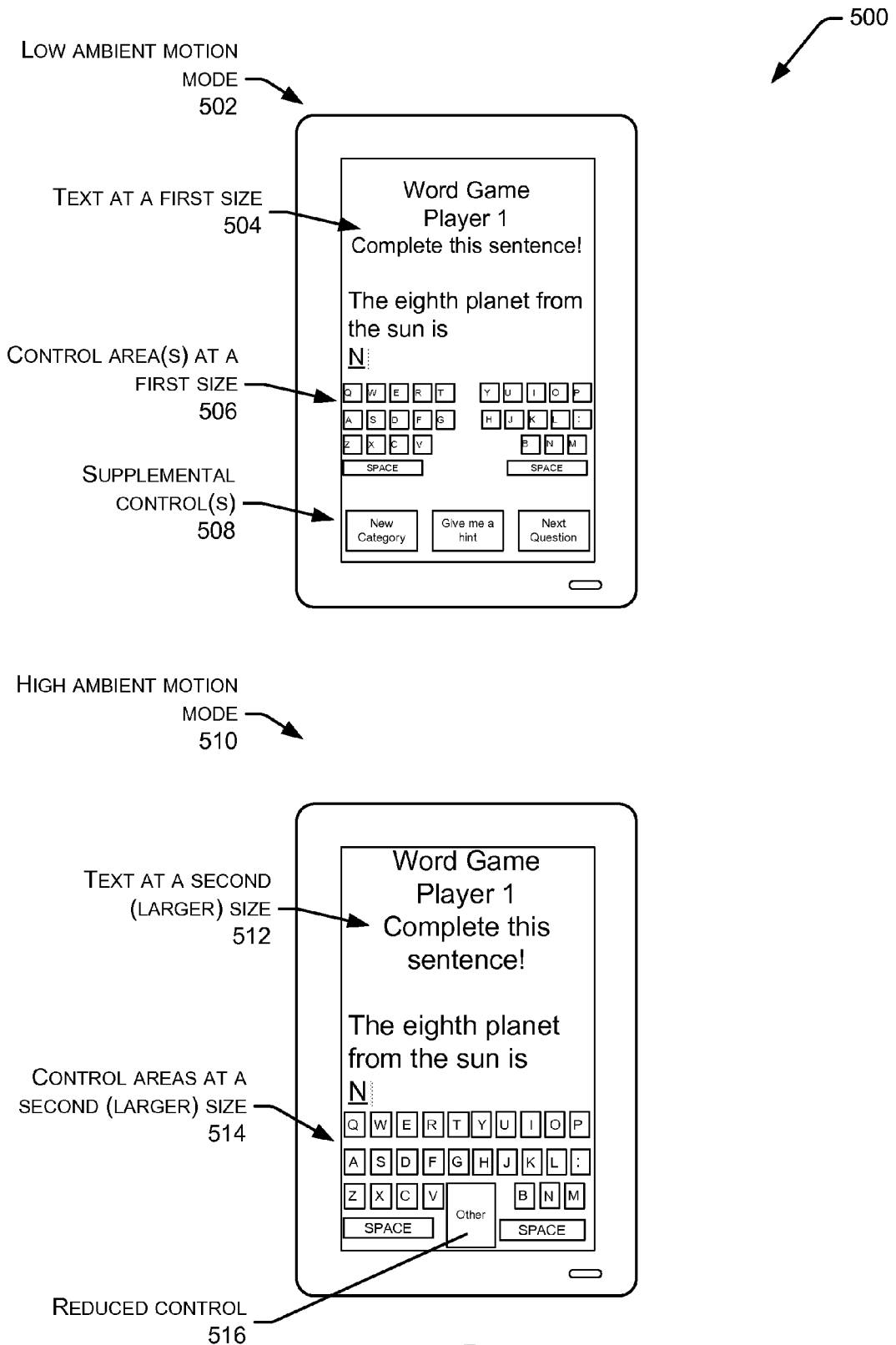
FIG. 5 depicts the electronic device adjusting dimensions of control areas and presentation on a user interface in response to an increase in the ambient motion.

FIG. 5 depicts the electronic device adjusting the user interface 500 under the control of the adaptive user interface module 114 in response to an increase in the ambient motion. A first scenario depicts the device 100 in a low ambient motion mode 502. In this mode, the adaptive user interface module 114 may determine the ambient motion of the device to be low 408. The text on the display 104 is presented at a first size 504, while the controls areas of the soft keyboard 106 are also presented at a first size 506. Three supplemental controls 508 are also presented in this example.

A second scenario depicts the device 100 in a high ambient motion mode 510. In this mode, the adaptive user interface module 114 has determined that a high level of ambient motion 412 is present and has adjusted the dimensions of the control areas and the presentation of the user interface to improve usability under these conditions. The text is now presented at a second (larger) size 512. In some implementations, fonts may be changes to improve readability as well. For example, a font may be changed from a script font to a serif font. As also shown, the control areas are also enlarged 514. This enlargement provides the user with a greater area to activate a desired control, reducing erroneous activations due to the vibration. Because of the enlargement of the text and controls, the adaptive user interface module 114 removes the supplemental controls 508 from presentation. Such removal provides additional space on the touch sensor 102 for the enlarged text, control areas, and so forth. Removal also minimizes the opportunity for inadvertent activation. Instead, the adaptive user interface module 114 presents a reduced control 516. In some implementations this reduced control 516 may comprise the option to open a menu of additional controls, such as the supplemental controls 508.

Figure 6:
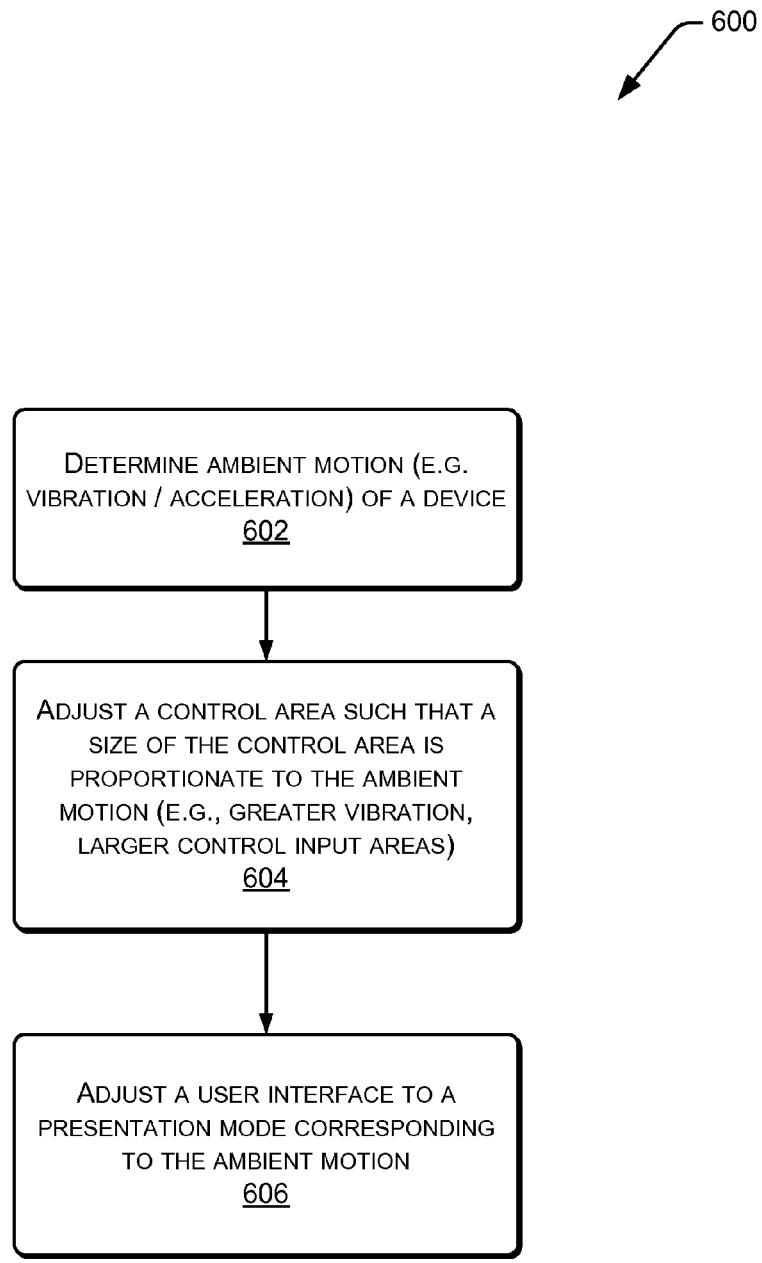
FIG. 6 is an illustrative process of adjusting control areas and presentation of the user interface in response to the ambient motion.
Figure 8:
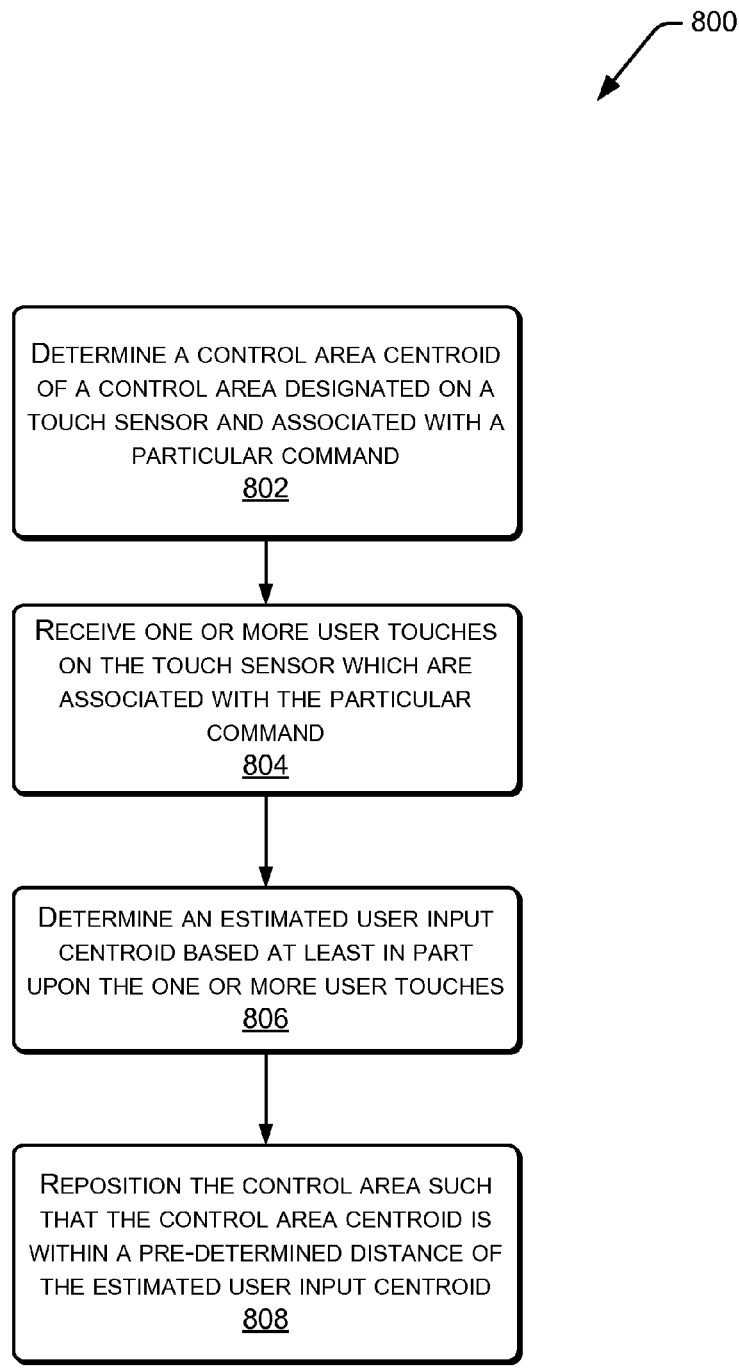
FIG. 8 is an illustrative process of repositioning the control areas in response to the user touch.

FIGS. 6 and 8 illustrate example processes 600 and 800 that may be implemented by the architectures described herein or by other architectures. These processes are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 6 is an illustrative process 600 of adjusting control areas 108 and presentation of the user interface in response to the ambient motion. At 602, the adaptive user interface module 114 determines ambient motion or other conditions of the device 100. This determination may comprise receiving data from one or more motion sensors 116, light sensors, sound sensors, and so forth.

At 604, the adaptive user interface module 114 adjusts a control area 108 such that a size of the control area 108 is proportionate to the ambient motion. For example, a low ambient motion 406 may correspond to relatively small control areas 108, while a high ambient motion 412 may correspond to a larger control area 108.

At 606, the adaptive user interface module 114 adjusts the user interface to a presentation mode corresponding to the ambient motion. Presentations modes may be associated with a particular level of ambient motion. For example, a low ambient motion 406 may be associated with a low motion presentation mode that presents text at a smallest default size and a maximum number of control areas 108. In contrast, a high ambient motion 412 may be associated with a high motion presentation mode which presents text at a largest available size, more readable font, larger individual control areas, and a reduced set of controls.

In some implementations the device 100 may utilize the ambient motion detected by the motion sensors 116 to reduce false command entries. For example, the adaptive user interface module 114 may disregard user touches of less than a pre-determined threshold of time duration when the ambient motion exceeds a pre-determined threshold level. Thus, bumps and jostles of the user's finger would not unintentionally activate commands.

Figure 7:
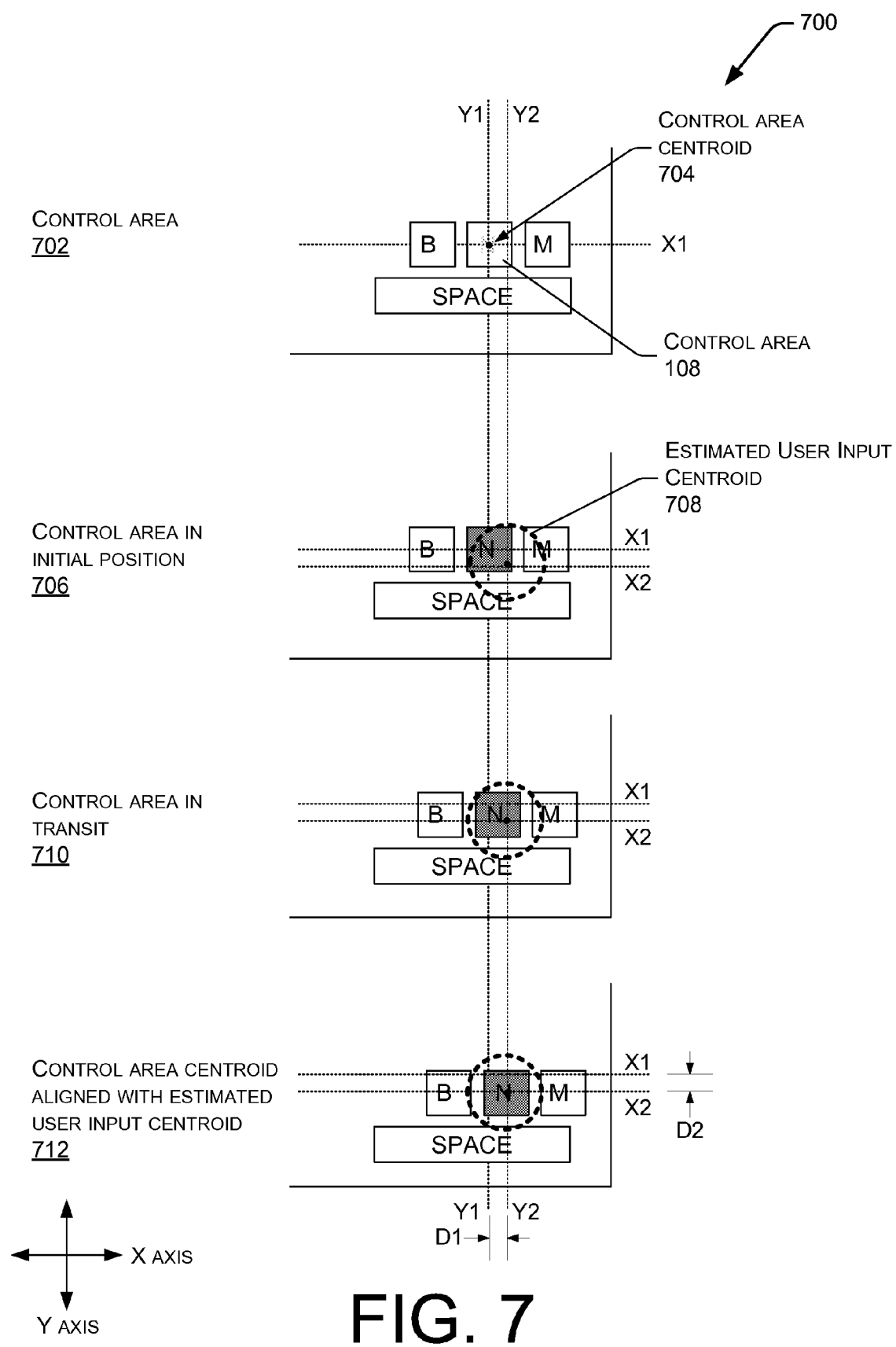
FIG. 7 illustrates repositioning of control areas in response to a user touch.

FIG. 7 illustrates repositioning 700 of control areas in response to a user touch. As shown at 702, each control area 108 has an associated control area centroid 704, shown at the intersection of Y1 and X1. This centroid may be a geometric centroid, average center, and so forth. In an ideal situation, the center of the touch point 110 meant for the control area 108 would correspond with the control area centroid 704.

As shown at 706, in actual use the user may not place a touch centered with the control area centroid 704. Each user touch 110 has a shape, from which an estimated user input centroid 708 is derived. This centroid may be derived from a single touch, or a plurality of touches. As shown here, the estimated user input centroid 708 is located at the intersection of lines Y2 and X2, and is thus displaced down and to the right of the control area centroid 704.

As shown at 710, the adaptive user interface module 114 repositions the control area centroid 704 such that it correspond with, or is within a pre-determined distance of, the estimated user input centroid 708. In other words, the control areas 108 drifts to better accommodate the user's reach and input style. In some implementations, the adaptive user interface module 114 may also vary the control area 108 dimensions, shape, or both. For example, control areas may be enlarged, or be shifted into other shapes including, but not limited to, geometric shapes such as triangles, hexagons, circles, and so forth.

As shown at 712, the control area centroid 704 is now aligned with the estimated user input centroid 708 at the intersection of Y2 and X2. The control area 108 has been displaced from an original position along an x-axis by D1, and along a y-axis by D2.

This repositioning allows the device 100 via the adaptive user interface module 114 to accommodate users with different hand sizes, different grips on the device 100, and so forth. For example, a user with very large fingers would experience the device 100 spreading the keys of the soft keyboard 106 away from one another, and in some implementations possibly increasing the size of those keys. Similarly, a user with relatively small hands may experience the device 100 reducing the distance between keys, and possibly reducing the size of those keys.

In some implementations the touch sensor 102 may be configured to detect an approaching touch, such as a finger held proximate to the touch sensor 102. In these implementations, the adaptive user interface module 114 may be configured to determine the estimate user input centroid 708 of the approaching touch. For example, as the user's fingers approach the touch sensor 102 and an estimated user input centroid 708 is determined, the controls areas may be repositioned as described above prior to actual contact of the user's finger with the touch sensor 102.

FIG. 8 is an illustrative process 800 of repositioning the control areas in response to the user touch. At 802, the adaptive user interface module 114 determines a control area centroid 704 of a control area 108 designated on a touch sensor 102 and associated with a particular command. For example, the particular command may be the selection of the letter "N" from the soft keyboard 106. In some implementations, the adaptive user interface module 114 may determine which command is associated with a touch based upon shape of the touch, magnitude of applied force, force distribution, distance between a centroid of the touch and centroids of proximate control areas, and so forth.

At 804, the adaptive user interface module 114 receives one or more user touches 110 on the touch sensor 102 associated with the particular command. For example, the user may have selected the letter "N" from the soft keyboard 106 several times. As described above, this may include an approaching touch where the touch sensor 102 is configured for non-contact sensing.

At 806, the adaptive user interface module 114 determines an estimated user input centroid 708 based at least in part upon the one or more user touches. This centroid may comprise a geometric center of the user touch.

At 808, the adaptive user interface module 114 repositions the control area 108 such that the control area centroid 704 is within a pre-determined distance of the estimated user input centroid 708. The repositioning may occur slowly, providing a presentation on the display 104 such that the control area 108 appears to "drift" across the screen. Conversely, the repositioning may occur more rapidly.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An electronic device comprising:
a processor;
a memory coupled to the processor;
a display coupled to the processor;
a touch sensor coupled to the processor;
a motion sensor coupled to the processor;
an adaptive user interface module stored in the memory and configured to execute on the processor to:
determine an ambient motion of the electronic device based at least in part upon output from the motion sensor;
determine that the determined ambient motion meets or exceeds a dynamically varying ambient motion threshold;
detect activation of a key, of a keyboard, a predetermined number of times during a predetermined time interval;
at least partly in response to determining that the determined ambient motion meets or exceeds the dynamically varying ambient motion threshold and detecting the activation of the key the predetermined number of times during the predetermined time interval, adjust a size of a control area designated on the touch sensor such that the size of the control area is adjusted to be proportionate to an amount of the determined ambient motion; and
adjust a user interface presented on the display based at least in part on the determined ambient motion.

2. The electronic device of claim 1, further comprising a control presented on the display, the control having a size corresponding to the size of the control area.

3. The electronic device of claim 1, wherein the control area comprises a soft keyboard key on a soft keyboard presented on the display.

4. The electronic device of claim 3, wherein the soft keyboard includes a plurality of soft keyboard keys distributed proximate to an exterior edge of the display to form a split keyboard.

5. The electronic device of claim 3, wherein soft keyboard keys of the soft keyboard that are assigned to a left hand of the user are distributed proximate to a left side of the display and soft keyboard keys of the soft keyboard that are assigned to a right hand of the user are distributed proximate to a right side of the display.

6. The electronic device of claim 1, wherein the ambient motion comprises motion imposed upon the electronic device independent of direction by the user.

7. The electronic device of claim 1, wherein the ambient motion comprises vibration or acceleration exceeding the dynamically varying threshold.

8. The electronic device of claim 1, wherein the adjusting of the user interface based at least in part on the determined ambient motion comprises presenting a reduced set of control areas on the user interface.

9. The electronic device of claim 1, wherein the adjusting of the user interface based at least in part on the determined ambient motion comprises presenting additional control areas on the user interface.

10. The electronic device of claim 1, wherein the electronic device is an electronic book reader, and wherein the display comprises an electrophoretic display.

11. The electronic device of claim 1, wherein the dynamically varying threshold is based at least on a relationship of a user of the electronic device to an environment in which the user is interacting with the electronic device.

12. One or more non-transitory computer-readable media storing instructions that, when executed by one or more processors, cause the one or more processors of a device to perform acts comprising:
- determining an amplitude of ambient motion of the device based at least in part upon output from a motion sensor coupled to the one or more processors;
- determining that the amplitude of ambient motion meets or exceeds an ambient motion threshold;
- detecting, via a touch sensor coupled to the one or more processors, activation of a key, of a keyboard, a predetermined number of times during a predetermined time interval; and
- at least partly in response to determining that the amplitude of ambient motion meets or exceeds the ambient motion threshold and detecting the activation of the key the predetermined number of times during the predetermined time interval, adjusting dynamically dimensions of the control area such that a size of the control area is proportionate at least in part to the amplitude of ambient motion.

13. The one or more non-transitory computer-readable media of claim 12, wherein a relatively high amplitude of ambient motion is associated with a greater control area size than a relatively low amplitude of ambient motion.

14. The one or more non-transitory computer-readable media of claim 12, further comprising adjusting a user interface presented on a display coupled to the one or more processors to a presentation mode corresponding to the amplitude of ambient motion.

15. The one or more non-transitory computer-readable media of claim 14, wherein the presentation mode, when the amplitude of the ambient motion is below the ambient motion threshold, comprises additional controls as compared to the presentation mode when the amplitude of the ambient motion is at or above the ambient motion threshold.

16. An electronic device comprising:
- a processor;
- a memory coupled to the processor;
- a touch sensor coupled to the processor and configured to provide a control area associated with a particular command;
- a display displaying a user interface corresponding to the control area associated with the particular command; and
- an adaptive user interface module stored in the memory and configured to execute on the processor to:
  - determine a control area centroid of the control area on the touch sensor;
  - receive a touch input on the touch sensor within the control area associated with the particular command;
  - determine an estimated input centroid of the touch input within the control area;
  - determine a first displacement between the control area centroid and the estimated input centroid in a first dimension;
  - determine a second displacement between the control area centroid and the estimated user input centroid in a second dimension;
  - reposition the control area such that the control area centroid is within a pre-determined distance of the estimated input centroid, the repositioning of the control area comprises:
    - moving at least a portion of the control area in the first dimension based at least on the first displacement, and
    - moving at least a portion of the control area in the second dimension based at least on the second displacement; and
  - at least in part in response to repositioning the control area, reposition the user interface.

17. The electronic device of claim 16, wherein the estimated input centroid comprises a geometric center.

18. The electronic device of claim 16, further comprising a motion sensor coupled to the processor, and wherein the adaptive user interface module is further configured to execute on the processor to:
- determine an ambient motion of the electronic device based at least in part upon output from the motion sensor;
- adjust a control area designated on the touch sensor such that a size of the control area is proportionate at least in part to the ambient motion; and
- adjust a user interface presented on a display coupled to the processor to a presentation mode corresponding to the determined ambient motion.

19. The electronic device of claim 16, wherein the touch sensor comprises an interpolating force sensitive resistor array.

20. The electronic device of claim 16, wherein the touch sensor comprises an optical receiver.

21. One or more non-transitory computer-readable media storing instructions that, when executed by one or more processors, cause the one or more processors to perform acts comprising:
- designating a control area associated with a particular command to accept a touch input on a touch sensor;
- displaying a user interface corresponding to the control area;
- determining a control area centroid of the control area;
- receiving a touch input within the control area associated with the particular command on the touch sensor;
- determining an estimated input centroid based at least in part upon the touch input;
- determining a first displacement between the determined control area centroid and the estimated input centroid in a first dimension;
- determining a second displacement between the determined control area centroid and the estimated input centroid in a second dimension;
- positioning the control area on a surface of the touch sensor such that the control area centroid is within a pre-determined distance of the estimated input centroid, the positioning comprising:
  - moving at least a portion of the control area in the first dimension based at least on the first displacement; and
  - moving at least a portion of the control area in the second dimension based at least on the second displacement; and
- repositioning the user interface, at least in part in response to positioning the control area on the surface of the touch sensor.

22. The one or more non-transitory computer-readable media of claim 21, wherein the touch input on the touch sensor is associated with the particular command based at least in part upon proximity to the control area centroid of the control area assigned to the particular command.

23. The one or more non-transitory computer-readable media of claim 21, further comprising:
- determining an ambient motion of a device associated with the touch sensor based at least in part upon output from a motion sensor coupled to the one or more processors; and adjusting a size of the control area such that the size of the control area is proportionate at least in part to the ambient motion.

* * * * *